United States Patent [19]

Muto

[11] 4,158,192
[45] Jun. 12, 1979

[54] RELEASING DEVICE FOR AN AUTOMATIC FIXED SPEED DRIVING SYSTEM

[75] Inventor: Masahito Muto, Toyota, Japan

[73] Assignee: Toyota Jidosha Kogyo Kabushiki Kaisha, Toyota, Japan

[21] Appl. No.: 846,556

[22] Filed: Oct. 28, 1977

[30] Foreign Application Priority Data

Aug. 1, 1977 [JP] Japan .................................. 52/92870

[51] Int. Cl.² ............................................. F02D 11/00
[52] U.S. Cl. .................................. 340/62; 180/105 E; 123/102
[58] Field of Search ............. 340/62, 263; 180/105 E; 123/102

[56] References Cited

U.S. PATENT DOCUMENTS

| 3,946,707 | 3/1976 | Gray | 123/102 |
| 4,084,659 | 4/1978 | Abend et al. | 123/102 |

*Primary Examiner*—Alvin H. Waring
*Attorney, Agent, or Firm*—Koda and Androlia

[57] ABSTRACT

A releasing device for an automatic fixed speed driving system including a first releasing signal detection means for supplying a releasing signal to a releasing signal input of the automatic fixed speed driving system when a stop lamp fuse is in a normal condition in response to the on action of a stop lamp switch and a second releasing signal detection means for supplying a releasing signal to the releasing signal input when the stop lamp fuse is in an abnormal condition in response to the on action of the stop lamp switch.

4 Claims, 1 Drawing Figure

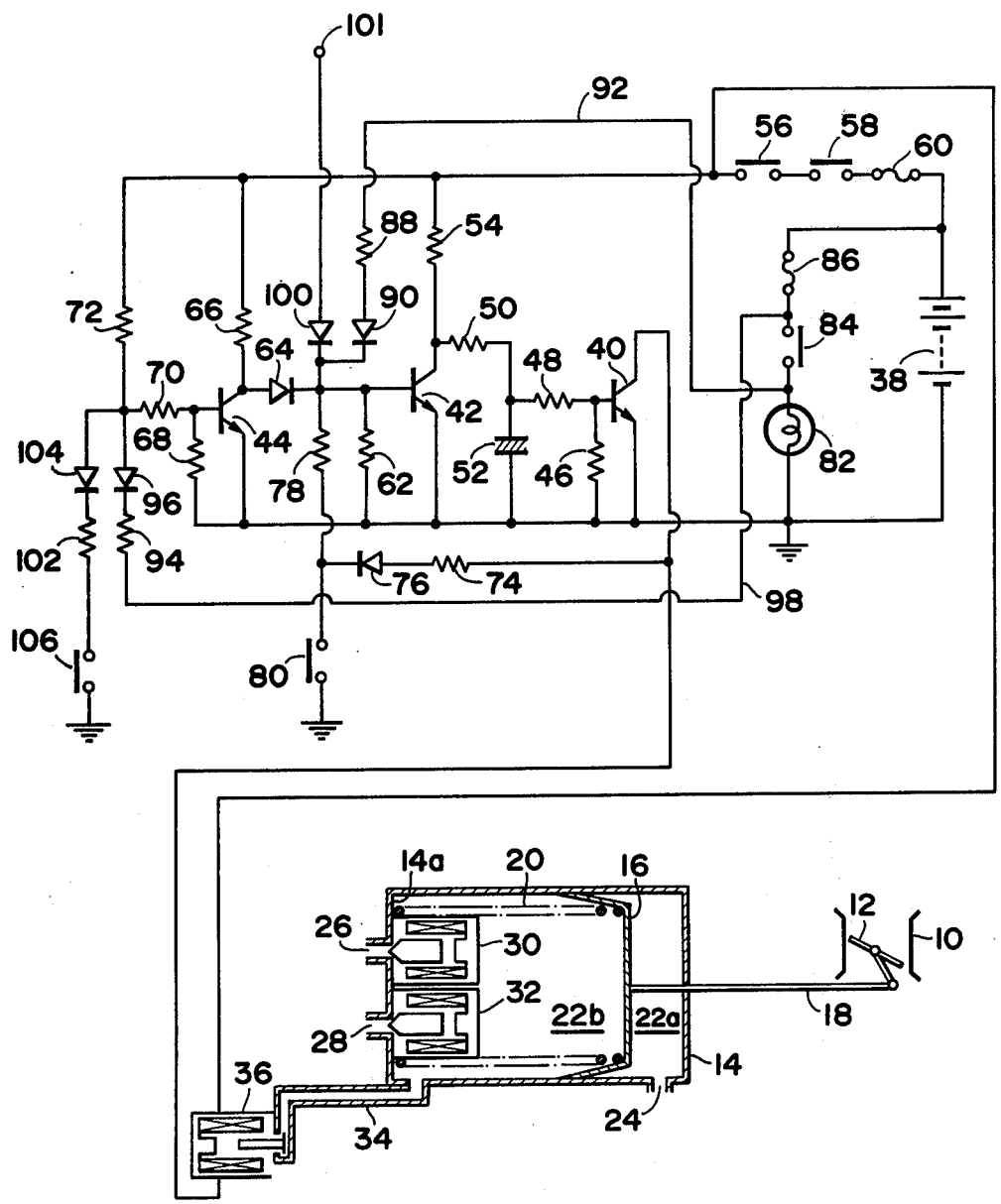

RELEASING DEVICE FOR AN AUTOMATIC FIXED SPEED DRIVING SYSTEM

BACKGROUND OF THE INVENTION

1. Field of Invention

This invention relates to automatic fixed speed driving systems and in particular to releasing means for such automatic fixed speed driving systems.

2. Prior Art

Automatic fixed speed driving systems are known in the art as a means for automatically controlling the driving speed of a motor vehicle at a constant rate without stepping on the accelerator once the speed is fixed at a certain speed at the driver's option. Such systems are able to reduce the driver's fatigue and to increase the gas mileage of the motor vehicle when it is cruising continuously at a fixed speed along the highway, etc. There have been several forms of automatic fixed speed driving systems but the basic composition is such that a comparison between the voltage drive from a driving speed and a voltage from a memory value from a memory circuit set by a speed command signal is utilized to generate a speed command signal by which the carburetor is controlled to speed up or slow down by means of an actuator provided on the carburetor.

A typical conventional type of automatic fixed speed driving system automatically starts to operate when a set signal is provided to a control circuit or the driving speed reaches the previously set speed. The automatic fixed speed driving system is released when the control circuit receives a releasing signal. Typically the releasing signal is supplied to a releasing device by way of braking action and is detected as an electrical signal by the on and off action of the stop lamp circuit. Since if one is driving a motor vehicle with a blown fuse in the stop lamp circuit a releasing signal is not generated, the prior art devices create a particular danger to the operator of such a motor vehicle.

To overcome such a problem, a system equipped with a transistorized detection circuit which detects a blown stop lamp fuse has been developed. Such a system typically has another drawback in that the automatic fixed speed driving system is always released when the stop lamp fuse blows even if the motor vehicle is at the pre-set cruising speed and the driver does not apply the brake. Furthermore there is an added disadvantage in that the transistorized detection circuit continually draws current and therefore consumes power from the battery even when the ignition switch is in the off state.

SUMMARY OF THE INVENTION

Accordingly it is the general object of the present invention to provide a releasing means capable of generating a releasing signal to release the fixed speed driving system even if the fuse in the stop lamp system is blown.

It is another object of the present invention to provide a releasing means for generating a releasing signal for the fixed speed driving system which is simple.

It is another object of the present invention to provide a releasing means for generating a releasing signal for the fixed speed driving system which does not consume battery power when the ignition switch is turned off.

In keeping with the principles of the present invention, the objects are accomplished by releasing means which includes two stop lamp switch manipulation detection means. Such stop lamp manipulation detection means are arranged and configured such that one of such detection means generates a releasing signal when the stop lamp switch is manipulated to the on condition whether or not the stop lamp fuse is blown.

BRIEF DESCRIPTION OF THE DRAWINGS

The above mentioned features and objects of the present invention will become more apparent by reference to the following description taken in conjunction with the accompanying drawings and in which:

FIG. 1 is a circuit diagram of a preferred embodiment of a releasing device for an automatic fixed speed driving system in accordance with the teachings of the present invention.

DETAILED DESCRIPTION OF THE INVENTION

Referring more particularly to the drawings, shown in FIG. 1 is a automatic fixed speed driving system with a releasing device in accordance with the teachings of the present invention. In FIG. 1, the automatic fixed speed driving system includes a throttle valve 12 provided on the carburetor 10 of a motor vehicle and the opening angle of the throttle valve 12 is controlled by an actuator 14. The actuator 14 has a diaphram 16 provided inside the actuator 14 which is connected to the throttle valve 12 by means of a control lever 18 and movement of the diaphram 16 is transmitted to throttle valve 12 to control its opening and closing. Between the sidewall 14a of actuator 14 in the diaphram 16 is inserted a compression spring 20. The compression spring 20 urges the diaphram 16 toward the right in FIG. 1. The first chamber 22a of actuator 14 opens to the atmosphere through a hole 24 and a second chamber 22b opens to the atmosphere through a hole 26. Through a hole 28 in second chamber 22b, second chamber 22b is also connected to a negative pressure section of the fixed speed driving system (which is not shown in FIG. 1) and the negative pressure of the engine is applied to hole 28. Each of the holes 26 and 28 are controlled by electro-magnetic valves 30 and 32 respectively and the differential force of atmospheric pressure between the first chamber 22a and the second chamber 22d and the urging force by the compression spring 20 hold the throttle valve 12 at the requested throttle opening angle.

Furthermore, a lead tube 34 is connected to the actuator 14 and the open end of lead tube 34 is controlled by an electromagnetic valve 36 which is open to the air or closed. Exciting current to the electromagnetic valve 36 is controlled by a control circuit in accordance with the teachings of the present invention.

One end of the electromagnetic valve 36 is connected to one terminal of a main switch 56 and the other end is coupled to the collector of a transistor 40. The emitter of transistor 40 is grounded to the negative terminal of the battery 38 and the on-off action of the transistor 40 controls the current supplied to the electromagnetic valve 36. Therefore, it should be apparent that the transistor 40 releases the fixed speed driving system.

In the illustrated embodiment of FIG. 1 there is provided a first inversion transistor 42 and a second inversion transistor 44. Between the base of transistor 44 and ground is provided a resistor 46 and between the base of transistor 40 and the collector of transistor 42 are provided resistors 48 through 50. Between ground and the common junction point of resistors 48 and 50 there is provided a condenser 52 which rejects the noise signals impressed on the base of transistor 40 by its integral control action. The emitter of transistor 42 is grounded and the collector is connected to a main switch 56 of the fixed speed driving system via resistor 54. The main switch 56 is further connected to the positive terminal of battery 38 by way of ignition switch 58 and fuse 60. Between the base of transistor 42 and ground is provided a resistor 62 and the base of transistor 42 is further connected to the collector of transistor 44 via a diad 64. The emitter of transistor 44 is grounded and the collector is connected to main switch 56 via resistor 66. Between the base of transistor 44 and ground is provided a resistor 68 and the base is further connected to main switch 56 via resistor 70 and 72. The collector of transistor 40 is coupled to the base of transistor 42 by means of a resistor 74, a diode 76 and a resistor 78. At the mid-junction point between diode 76 and resistor 78 is connected one terminal of a set switch 80 which is manually operated by a driver or which is automatically switched on when the motor vehicle in motion is satisfied with a requested condition to operate the automatic fixed speed driving system.

In the present invention, the fixed speed driving system is released by the on action of the stop lamp switch. Both terminals of the stop lamp switch are connected to separate releasing signal detection means. A stop lamp 82 is grounded at one end of the stop lamp switch and the positive terminal battery 38 is coupled to the other terminal of stop lamp switch 84 via a stop lamp fuse 86. Between the terminal of the stop lamp switch 84 which is closest to the stop lamp 82 and opposite from the battery 38 and the transistor 42, which is one input terminal for the releasing signal, is provided the first releasing signal detection means 92 including a resistor 88 and a diode 90. Between the terminal of the stop lamp switch 84 nearest the battery and the base of transistor 44, which is the other input terminal for a releasing signal, is provided the second releasing signal detection means 98 including a resistor 94 and a diode 96.

In FIG. 1, a third releasing signal is further supplied from a releasing terminal 101 to the base of transistor 42 via a diode 100 and a fourth releasing signal is fed from a releasing switch 106 to the base of transistor 44 by way of a resistor 102 and a diode 104.

In operation, when the electromagnetic valve 36 is in the off state, the lead to 34 is open to the atmosphere and the fixed speed driving system is released since there is equal atmospheric pressure between the second chamber 22b and the first chamber 22a of actuator 14 and the actuator 14 does not control the throttle valve 12. On the other hand, when the electromagnetic valve 36 is an on state, the lead tube 34 is closed and the actuator 14 holds the throttle valve 12 at the requested opening in response to an opening signal controlled by the electromagnetic valves 30 and 32.

The switching of the electromagnetic valve 36 is controlled by the on and off action of transistor 40 which is in turn controlled by the setting signal from the setting switch 80 fed to the first inversion transistor 42 and by the releasing signals supplied by the diodes 90 and 100. The on off action of transistor 40 is further controlled by the releasing signal from the second inversion transistor 44 which controls the on-off action of the first inversion transistor 42. Furthermore, the on-off action of the second inversion transistor 44 is controlled by a releasing signal fed to its base via diodes 96 and 104.

The present invention is characterized in that the releasing signal is detected from both terminals of the stop lamp switch 84 and in particular the terminal of the stop lamp switch 84 nearest the battery 38 and the terminal of the stop lamp switch 84 nearest the stop lamp 82. In other words, both the releasing signal generated at the terminal of the stop lamp switch 84 which is coupled to a source of voltage and the releasing signal from the terminal of the stop lamp switch 84 which is coupled to ground are individually supplied to the first and second inversion transistors 44 as the respective releasing signals. Accordingly, the present invention has the advantage that either one of the releasing signals can control the on-off action of transistor 40 without failure.

For the condition that the setting switch is placed in the off position and a releasing signal is unable to be supplied, a control voltage is fed to the control circuit from the battery 38 by way of the fuse 60, ignition switch 58 and the main switch 56 when the main switch 56 of the fixed speed driving system is switched on. At this initial state, transistor 44 is in the on state without the releasing signal being applied to its base. Although the base of transistor 44 is not supplied with the releasing signal, the transistor 44 is in the on state since base current is fed to it by way of electromagnetic valve 36, resistor 74, diode 76 and resistor 78. Accordingly, the collector of transistor 42 stays at a low electric potential and transistor 40 is kept in the off state.

In this condition, the base current to activate the transistor 42 flows through electromagnetic valve 36, but this current valve is too small to drive the electromagnetic valve 36.

At this time, the setting switch 80 is placed in the on condition in order to activate the fixed speed driving system. The on condition of the setting switch 80 changes the flow of base current supplied to the base of transistor 42 from battery 38 through electromagnetic valve 36 to ground through diode 76 and setting switch 80 and cuts off the base current to transistor 42. Transistor 42 is then placed in the off condition at this time. Resistor 74 and diode 76 inserted between the electromagnetic valve 36 and the setting switch 80 effectively reject noise signals received from the other circuits. As a result the off action of transistor 42, condenser 52 is charged by the current from battery 38 via resistors 54 and 50 and switches on transistor 40 when the charging voltage on condenser 52 reaches a pre-determined value. In this condition, there is a flow of current from the battery 38 through the electromagnetic valve 36, resistor 74 and diode 76, but the comparatively high value of resistor 74 prevents enough current from being supplied to excite and drive the electromagnetic valve 36 even though the setting switch 80 is switched on. Enough exciting current is not supplied to the electromagnetic valve 36 until transistor 40 is in the on state. In such a condition lead pipe 34 is closed and the actuator 14 adjusts the throttle opening on the basis of signals supplied to the electromagnetic valves 30 and 32 in accordance with a certain control specification. In most cases, setting switch 80 consists of a switch which is turned on by manual operation and turned off automatically. However, the on action of transistor 40 during this time distributes all the current going through the electromagnetic valve 36 to transistor 40 and prevents the base current of transistor 42 from flowing through the path consisting of resistor 74, diode 76 and resistor 78. Thus, transistor 42 is kept in the off state and the fixed speed driving action continues.

In order to release the fixed speed driving system, it is suitable to switch on the first invertion transistor 42 directly or to switch on the first inversion transistor 42 indirectly by switching off the second inversion transistor 44. In order to switch on the first inversion transistor 42 directly, the base of transistor 42 must be supplied with a high electrical potential releasing signal, which switches on transistor 42. Therefore the base of transistor 40 stays in at a low electrical potential and the transistor 40 is in the off state. On the other hand, in order to switch off the transistor 44 its base must be supplied with a low electrical potential. The off action of transistor 44 provides the high electrical potential signal to the base of first inversion transistor 42 and transistor 42 is placed in the on state. Accordingly, transistor 40 is switched off and the current to electromagnetic valve 36 is cut off.

In the present invention, two types of releasing signals are supplied to the corresponding input terminals of the fixed speed driving system from both terminals of the stop lamp switch 84. When the stop lamp switch 84 is switched on and the stop lamp fuse 86 is in a normal state, a high electrical potential equaled to that of battery 38 is fed to the releasing signal input terminal, that is, the base of the first inversion transistor 42 by way of the fuse 86, switch 84 and the first releasing signal detection means 92 which includes resistor 88 and diode 90. Accordingly, the fixed speed driving system is released. In this state, a high electrical potential is supplied to a control circuit from the fuse 86 through the second releasing signals detection means 98 but this signal is cut off by the diode 96 and does not affect the action of transistor 44.

On the other hand, when the stop lamp fuse 86 is blown or in other words in an abnormal condition, no releasing signal is detected through the first releasing signal detection means 92; but the on action of the stop lamp switch 84 grounds the second releasing signal detection means 98 via stop lamp switch 84 and stop lamp 82 and a releasing signal of a low electrical potential is supplied to the base of transistor 44 so that the fixed speed driving system is released.

As described above, the on-off action of the stop lamp switch is supplied to the releasing signal input terminal of the control signal regardless of the state of the stop lamp fuse 86 and the fixed speed driving system can be released.

In the illustrated embodiment, the signal from the stop lamp switch 84 through the first and second releasing signal detection means is supplied to the releasing signal input terminal of different control circuits, but it should be apparent that by providing an invertor in either one of the releasing signal detection paths it would be possible to feed the two types of releasing signals from the stop lamp switch 84 to the same releasing signal input terminal of the control circuit.

In all cases it is understood that the above described embodiment is merely illustrative of but a few of the many possible specific embodiments which represent the applications of the principles of the present invention. Numerous and other arrangements can be readily devised by those skilled in the art without departing from the spirit and scope of the invention.

I claim:

1. A releasing device for an automatic fixed speed driving system for a motor vehicle having a stop lamp circuit including a power source, a stop lamp switch, a stop lamp fuse provided between one terminal of said stop lamp switch and said power source and a stop lamp coupled to the other terminal of said switch, said system comprising:

a first releasing signal detection means for supplying a releasing signal to a releasing signal input of the automatic fixed speed driving system when the stop lamp fuse is in a normal condition in response to the on action of a stop lamp switch accompanied by the manipulation of a motor vehicle brake; and a second releasing signal detection means for supplying a releasing signal to a releasing signal input of the automatic fixed speed detection system when the stop lamp fuse is in an abnormal condition in response to the on action of the stop lamp switch accompanied by the manipulation of the motor vehicle brake.

2. A releasing device according to claim 1 wherein said first releasing signal detection means comprises a series connection of a resistor and a diode coupled between the terminal of said stop lamp switch which is coupled to said stop lamp and said releasing signal input.

3. A releasing device according to claim 2 wherein said second releasing signal detection means comprises a series connection of a diode and an inverter coupled between the terminal of said stop lamp switch which is coupled to said power source via said fuse and said releasing signal input.

4. A releasing device according to claim 3 wherein said automatic fixed speed driving system comprises electromagnetic valves.

* * * * *